R. CRANE, Jr.
POTATO-MASHER.
No. 171,603. Patented Dec. 28, 1875.
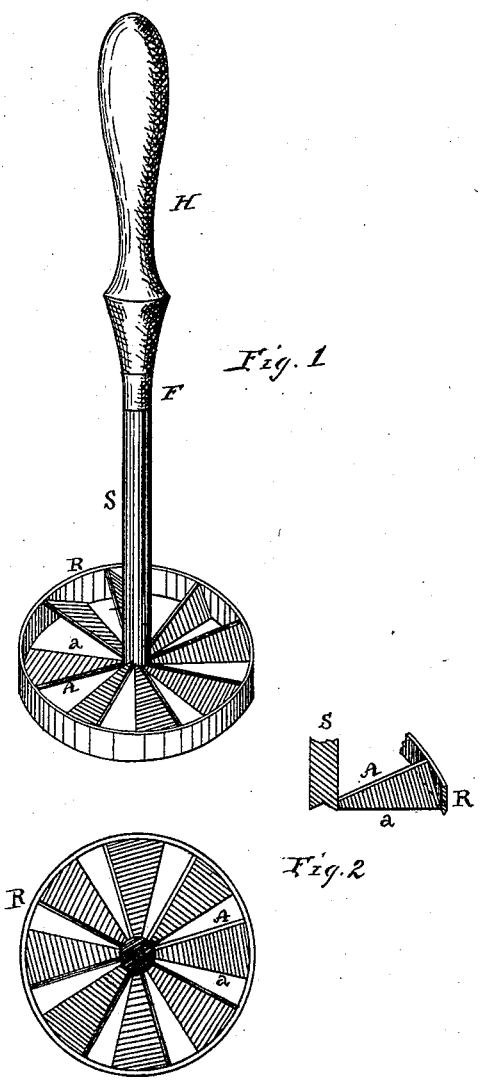
WITNESSES.
J.W. Yoemm
John Haag,
INVENTOR.
Robert Crane Jr.

UNITED STATES PATENT OFFICE.

ROBERT CRANE, JR., OF COLUMBIA, PENNSYLVANIA.

IMPROVEMENT IN POTATO-MASHERS.

Specification forming part of Letters Patent No. 171,603, dated December 28, 1875; application filed February 26, 1875.

*To all whom it may concern:*

Be it known that I, ROBERT CRANE, Jr., of the borough of Columbia, in the State of Pennsylvania, have invented a certain Improvement in Kitchen Utensils for Mashing Potatoes or the like, of which the following is a specification:

This improvement relates to a class of household and kitchen utensils, used for mashing boiled potatoes, turnips, and the like, and as a whole constitutes a new article of manufacture, and furnishes a neat, cheap, and efficient implement for the purpose.

The accompanying drawing, with letters of reference marked thereon, and a brief explanation, will enable those skilled in the art to make and use the same, in which—

Figure 1 is a perspective view of the utensil with its handle; Fig. 2, a plan view of the radiating disk plates and attachment.

The drawing shows an ordinary handle, H, provided with a ferrule, F, affixed to a central shaft or stem, S, the base of which is rigidly connected with a ring, R, by means of oblique, radiating wedge-shaped blades, six, eight, or more in number. These blades are connected with the base of the central shaft or stem S, the upper edge A radiating and inclined upward to meet the upper edge of the ring R, and the lower edge *a* of the blades A radiating in a horizontal line, and connected to the lower portion of said ring. Just above its cutting-edge these blades widen radially outward, and unite with the vertical inner face of the ring in an oblique direction, inclined at angle of about twenty-five or thirty degrees. This oblique position gives the upper and lower edges of the blades a sharp angle or cutting-edge, and the narrower triangular and oblique spaces between the blades renders this implement of superior utility and efficiency.

In using the implement, it is pressed vertically downward, and simultaneously revolved by the hand, and in order that this may be done it is apparent that the connection between the handle and ring and blades must be a rigid one, as previously stated.

I am aware that it is not new to combine a handle with oblique horizontal blades joined or attached to an encircling ring, to form a revolving churn-dasher, and I, therefore, restrict my claim to—

The improved potato-masher formed of the ring R, oblique cutting-blades A, and handle H, said parts being rigidly connected, as shown and described, to admit of the operation specified.

ROBERT CRANE, JR.

Witnesses:
 J. W. YOCUM,
 JOHN HAAG.